(12) United States Patent
Holverson (10) Patent No.: US 10,994,614 B2
(45) Date of Patent: May 4, 2021

(54) PUMP SYSTEM FOR VEHICLES (71) Applicant: Monroe Truck Equipment, Inc., Monroe, WI (US)

(72) Inventor: Andrew Holverson, Monroe, WI (US)

(73) Assignee: MONROE TRUCK EQUIPMENT, INC., Monroe, WI (US)

( * ) Notice: Subject to any disclaimer, the term of this patent is extended or adjusted under 35 U.S.C. 154(b) by 272 days.

(21) Appl. No.: 16/192,973

(22) Filed: Nov. 16, 2018

(65) Prior Publication Data

US 2019/0143818 A1 May 16, 2019

Related U.S. Application Data (60) Provisional application No. 62/587,162, filed on Nov. 16, 2017.

(51) Int. Cl.
| | |
|---|---|
| *B60K 25/06* | (2006.01) |
| *B60L 1/00* | (2006.01) |
| *F04B 17/05* | (2006.01) |
| *F04B 19/04* | (2006.01) |
| *F04B 23/04* | (2006.01) |
| *A01C 19/02* | (2006.01) |
| *B60R 11/00* | (2006.01) |

(52) U.S. Cl.
CPC .............. *B60L 1/003* (2013.01); *B60K 25/06* (2013.01); *F04B 17/05* (2013.01); *F04B 19/04* (2013.01); *F04B 23/04* (2013.01); *A01C 19/02* (2013.01); *B60L 2200/40* (2013.01); *B60R 2011/0042* (2013.01); *B60Y 2200/40* (2013.01); *F04B 2201/12* (2013.01)

(58) Field of Classification Search
CPC ...... F04B 23/04; F04B 2201/12; F04B 17/05; F04B 19/04; B60L 1/003; B60L 2200/40; B60K 25/06; A01C 19/02; B60R 2011/0042; B60Y 2200/40; B67D 5/52; B08B 3/02
USPC .................................................. 222/134, 135
See application file for complete search history.

(56) References Cited

U.S. PATENT DOCUMENTS

| | | | | |
|---|---|---|---|---|
| 5,180,108 A * | 1/1993 | Miyamoto | ............. | A62C 27/00 180/69.6 |
| 6,547,527 B2 * | 4/2003 | Gaither | ................... | F04B 17/05 417/16 |
| 6,773,238 B1 * | 8/2004 | Sprakel | ................... | F04B 17/06 417/234 |
| 9,395,049 B2 * | 7/2016 | Vicknair | ................... | F17D 1/08 |
| 2003/0071062 A1 * | 4/2003 | Miller | ................... | G05D 11/133 222/135 |
| 2009/0068031 A1 * | 3/2009 | Gambier | ................ | F04B 47/02 417/364 |

(Continued)

*Primary Examiner* — James A Shriver, II
*Assistant Examiner* — Hilary L Johns
(74) *Attorney, Agent, or Firm* — Quarles & Brady LLP (57) ABSTRACT

A vehicle-mounted pump system is disclosed for use with a service vehicle. A chassis can be configured to be secured to the service vehicle, and a frame can be supported by the chassis. A plurality of pumps can be supported by the frame, with each of the pumps being configured to pump liquid for dispersal external to the service vehicle. A power source can be supported by at least one of the chassis and the frame. A power transmission system can be configured to transfer power from the power source to the plurality of pumps.

13 Claims, 8 Drawing Sheets

(56) References Cited

U.S. PATENT DOCUMENTS

| | | | |
|---|---|---|---|
| 2010/0068071 A1* | 3/2010 | Bowden | B66F 11/044 417/16 |
| 2011/0160920 A1* | 6/2011 | Orr | E02F 9/24 700/283 |
| 2014/0311760 A1* | 10/2014 | Rogers | A62C 27/00 169/24 |
| 2015/0059330 A1* | 3/2015 | Thirunavukarasu | E01C 19/17 60/430 |
| 2018/0266412 A1* | 9/2018 | Stokkev | F04B 49/08 |

* cited by examiner

PUMP SYSTEM FOR VEHICLES

CROSS REFERENCE TO RELATED APPLICATIONS

This application claims the benefit of U.S. Provisional Patent Application No. 62/587,162 filed on Nov. 16, 2017, the entire contents of which are incorporated herein by reference.

BACKGROUND

In many applications, it may be useful to provide systems for pumping one or more fluids. In some applications, it may be useful to provide multiple pumps.

SUMMARY

Some embodiments of the invention provide a pump system with multiple pumps and a power source. In some embodiments, the power source can be a gasoline or other internal combustion engine. In some embodiments, multiple pumps (e.g., three or more pumps) can be powered by a single power source (e.g., a single gasoline engine). In some embodiments, multiple pumps (e.g., three or more pumps) can be powered by a single power transmission system. In some embodiments, a power transmission system can include a single flexible power transmission element configured to transfer power from a single power source (e.g., a single gasoline engine) to multiple pumps (e.g., three or more pumps).

Some embodiments of the invention provide a vehicle-mounted pump system for use with a service vehicle. A chassis can be configured to be secured to the service vehicle, and a frame can be supported by the chassis. A plurality of pumps can be supported by the frame, with each of the pumps being configured to pump liquid for dispersal external to the service vehicle. A power source can be supported by at least one of the chassis and the frame. A power transmission system can be configured to transfer power from the power source to the plurality of pumps.

Some embodiments of the invention provide a service vehicle having a battery, a first internal combustion engine, and a pulley-driven pump system. The pulley-driven pump system can include a chassis configured to be secured to the service vehicle, and a frame supported by the chassis. A plurality of pumps can be supported by the frame, with each of the pumps being configured to pump liquid for dispersal external to the service vehicle. The pulley-driven pump system can include a power source, which can be a second internal combustion engine different from the first internal combustion engine. The pulley-driven pump system can include a power transmission system configured to transfer power from the power source to the plurality of pumps.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, the phrases "at least one of A, B, and C," "one or more of A, B, and C," and the like, are meant to indicate A, or B, or C (individually or plurally), or any combination of A, B, and/or C (individually or plurally), including one or more instances of A, one or more of instances B, and/or one or more of instances of C.

As noted above, it may be useful to provide pump systems for pumping one or more fluids. For example, in the context of landscape and lawn services, it may be useful to provide pumps for dispersing fertilizers, pesticides, or various other liquids. In some embodiments, it may be useful to provide separate pumping for separate liquids (e.g., for independent dispersal, or for simultaneous distribution from a dual-outlet or other spraying system).

In some contexts, pump systems may be subject to size, weight, power, and other requirements or limits. For example, in some cases, pump systems may be configured to be mounted to, transported by, and operated from a vehicle (e.g., a service truck for landscape and lawn services). Accordingly, for example, it may be useful for a pump system to exhibit appropriate pump power while also being relatively lightweight, relatively compact in size, and capable of being operated using relatively portable power sources.

Embodiments of the invention can address these and other issues. For example, in some embodiments, a pump system according to the invention can include multiple pumps configured to separately provide pumping power for dispersal of multiple fluids (e.g., the same or different fluids from different fluid sources, such as on-vehicle tanks or other storage systems). In some embodiments, the multiple pumps can be collectively mounted on a unified support structure, along with an associated power source, in order to provide a relatively compact system envelope.

In some embodiments, a single power source (e.g., a single internal combustion engine) can be configured to simultaneously power each of multiple pumps of a pump system. In some embodiments, a single flexible power transmission element, such as a single belt, can be configured to simultaneously provide power to each of multiple pumps. In some embodiments, a control device (e.g., a powered control device, such as an electrical clutch) can be provided to control operation of one or more of the pumps.

In some embodiments, a power source can also be configured to provide power to external systems (e.g., systems located remotely from the pump system). For example, an internal combustion engine configured to power multiple pumps can also be configured to provide power to charge a vehicle battery (e.g., the battery of a service vehicle that carries the relevant pump system for in-field operations). Correspondingly, in some embodiments, an internal combustion engine of a pump system can be different from an internal combustion engine that powers a vehicle, such a service vehicle for landscape and lawn services, that carries the pump system.

FIGS. 1-4 illustrate an example pump system 20 according to an embodiment of the invention. In some embodiments, the pump system 20 can be configured to be secured to a vehicle 21 for operation, so that the pump system 20 can be transported between work sites on, and generally operated from, the vehicle 21. In some configurations, the pump system 20 can be configured to be secured to a service vehicle (e.g., for landscape and lawn services), with pumps of the pump system 20 configured to pump chemicals for use in lawn care or other operations.

Generally, the pump system 20 can include any number of pumps and a power source. In the embodiment illustrated, the pump system 20 beneficially includes three pumps 22, and an internal combustion engine 24, all of which are secured to and supported on a support chassis 26. In some embodiments, the support chassis 26 can be configured to be readily secured to the vehicle 21, which can be a truck, service vehicle, or other vehicle. This may be useful, for example, in order to accommodate retrofitting of vehicles with the pump system 20 (or similar other systems).

Generally, the pumps 22 can be powered by the engine 24 via a transmission system 28. In some embodiments, the transmission system 28 can include a set of pulleys or other rotating elements (not shown in FIGS. 1-4) connected by one or more belts or other flexible power transmission elements (not shown in FIGS. 1-4). In this regard, for example, the pulleys or other rotating elements can serve as one or more power outputs for the engine 24 and as one or more power inputs for the pumps 22. In some embodiments, including as illustrated for the system 20 (see, e.g., FIG. 6), a single belt or single other flexible power transmission element can be used to transfer rotational power from the engine 24 to a plurality of the pumps 22.

Generally, a frame 30 can be provided, to which the pumps 22 and the engine 24 can be secured, so that the frame 30 supports the pumps 22 and the engine 24 above the chassis 26. In different embodiments, the frame 30 can be configured in different ways, in order to support the pumps 22 and the engine 24 at appropriate locations and orientations.

In some embodiments, particular configurations of the frame 30 can be selected to provide appropriate clearance for operation and maintenance of the pumps 22 and the engine 24. This may be useful, for example, in order to allow for convenient or efficient connections between the pumps 22 and the engine 24 and other systems (e.g., hoses of a sprayer system (not shown), or electrical components for an electrical system (not shown)), or to enable the pump system 20 as a whole to fit within a desired envelope (e.g., for inclusion in the limited space of a cargo platform of a vehicle).

In some embodiments, the frame 30 can also provide shielding for certain system components. For example, in the embodiment illustrated, the frame 30 includes a multi-part shield 32 configured to at least partially cover part or all of the transmission system 28 (e.g., one or more belts) that transfers power from the engine 24 to the pumps 22. In some embodiments, the shield 32 can include removable panels (e.g., panels that are removable with hand tools, or via manual release of appropriate fasteners) in order to allow appropriate access to system components and/or useful customization for particular arrangements or contexts.

In some embodiments, two of the pumps 22 are mounted on the frame 30 on the same horizontal plane, and the third pump 22 is mounted substantially above the two pumps 22 that mounted on the frame 30 on the same horizontal plane. The third pump 22 can be mounted partly, substantially, or entirely above the other two pumps to provide appropriate clearance for operation and maintenance of the pumps 22 and the engine 24. As similarly noted above, for example, this can allow for convenient or efficient connections between the pumps 22 and the engine 24 and other systems (e.g., hoses of a sprayer system (not shown), or electrical components for an electrical system (not shown)), or enable the pump system 20 as a whole to fit within a desired envelope (e.g., for inclusion in the limited space of a cargo platform of a vehicle).

In some embodiments, different control devices can be provided. For example, some embodiments can include an electrical or other clutch (not shown in FIGS. 1-4) to control operation of the pumps 22 (e.g., through electronic control of one or more pulleys associated with a belt that transfers power from the engine 24 to the pumps 22). In some embodiments, one or more electronic controller (e.g., one or more processor devices) (not shown) can be configured to control operation of the engine 24, one or more of the pumps 22, the transmission system 28, or other system components (e.g., electronics to control charging of batteries, as also discussed below, or other powering of external components).

Figure 1:
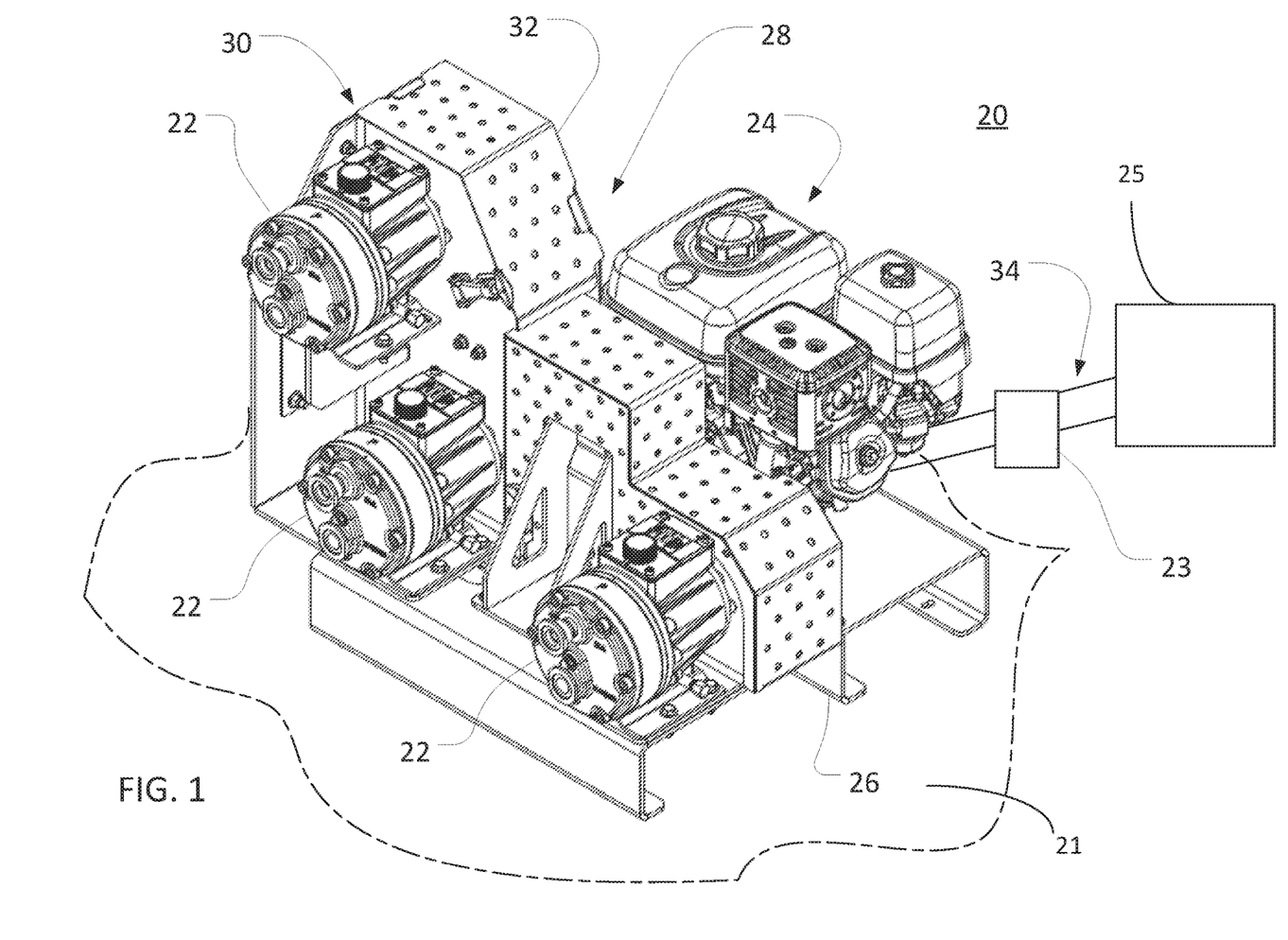
FIG. 1 is a front, right, top isometric view of a pump system according to one embodiment of the invention.
Figure 2:
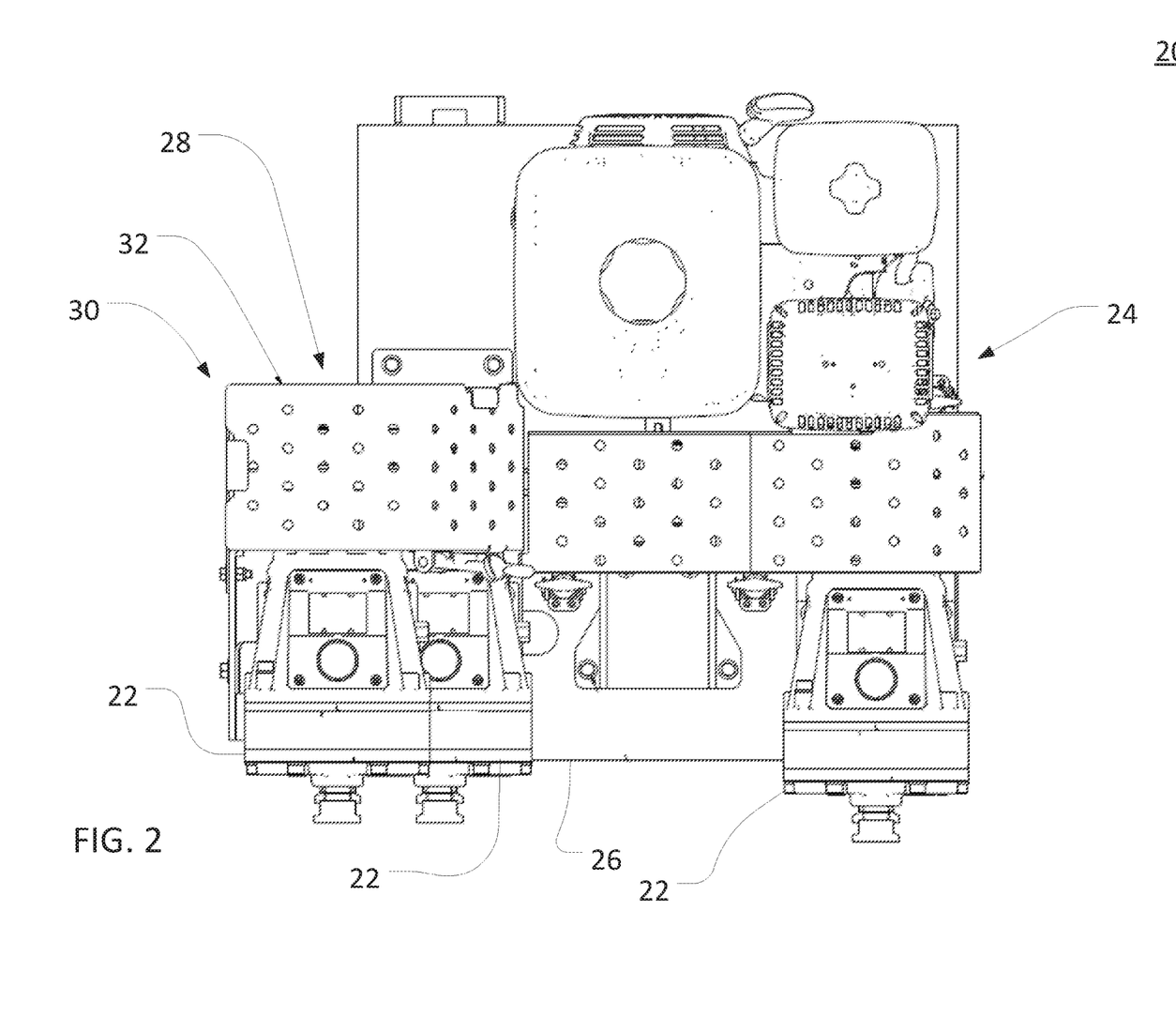
FIG. 2 is a top plan view of the pump system of FIG. 1.
Figure 3:
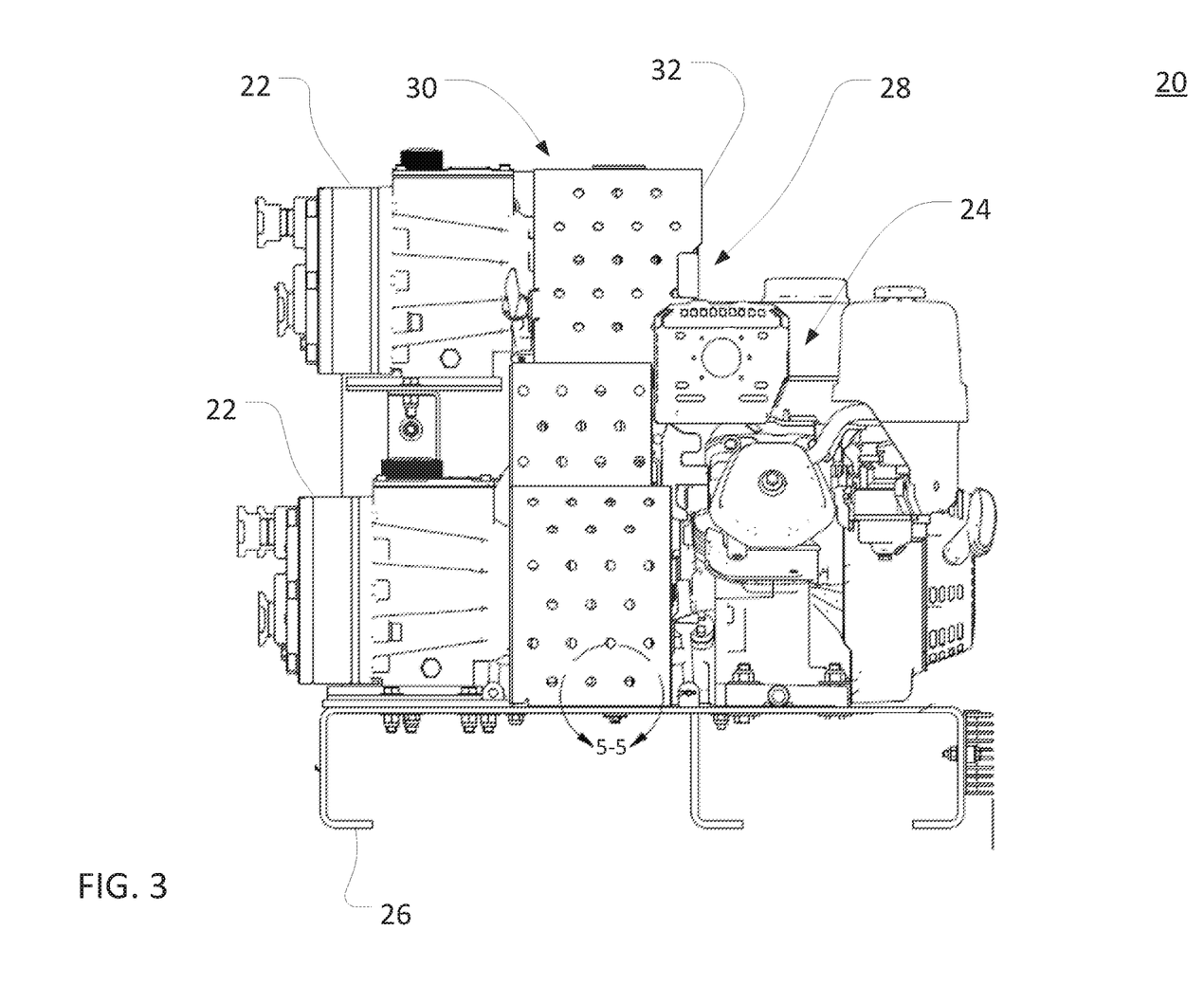
FIG. 3 is a right side elevation view of the pump system of FIG. 1.
Figure 4:
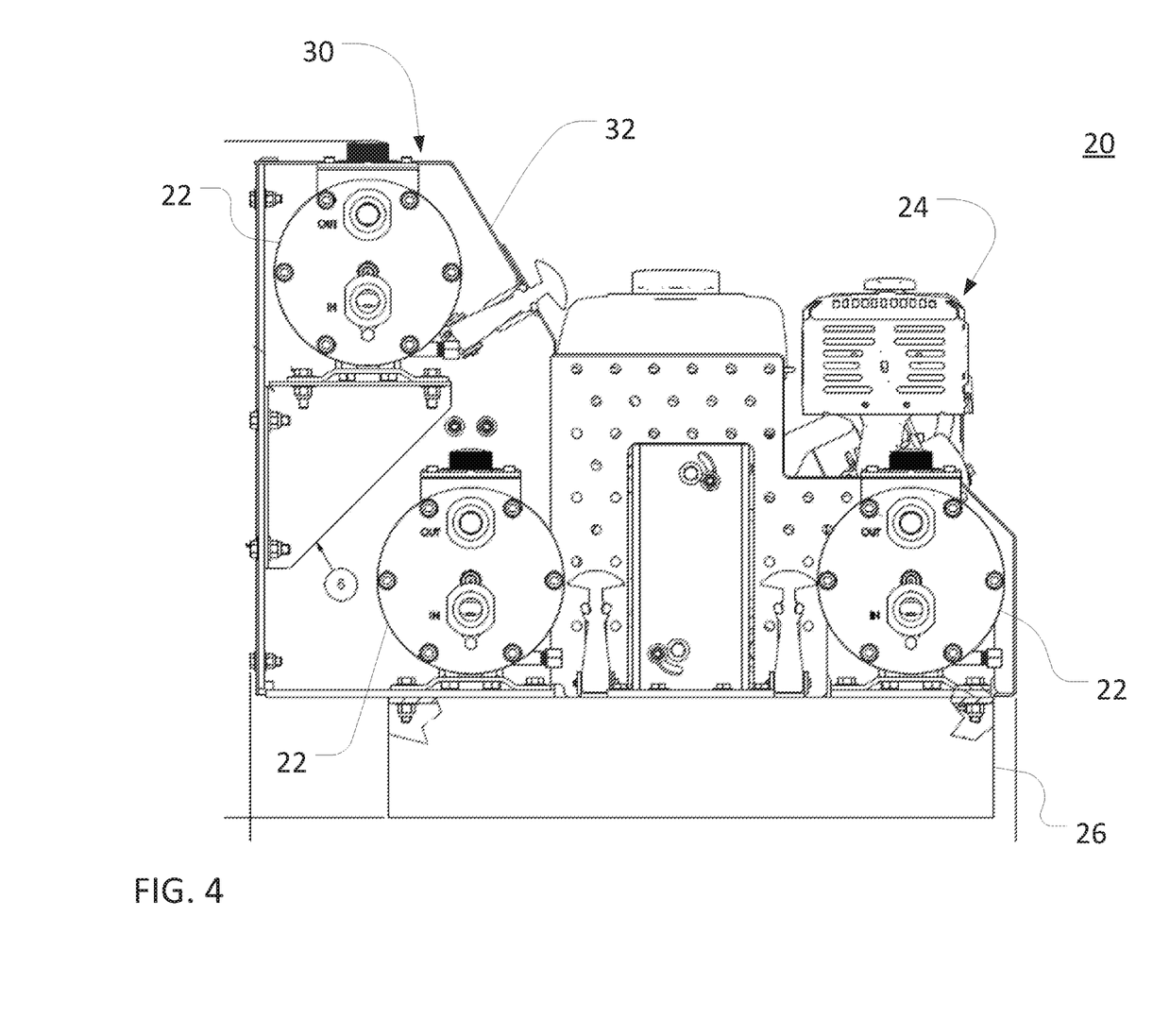
FIG. 4 is a front elevation view of the pump system of FIG. 1.

As also noted above, in some embodiments, the pump system 20 can be configured to provide power to external components. For example, in some embodiments, the mechanical power generated by the engine 24 can be used to generate electricity (e.g., with equipment supported by the chassis 26, or elsewhere). In some embodiments, the resulting electricity can be used internally to the pump system 20, such as for operation of an electrical clutch or for direct electronic control of the pumps 22. In some embodiments, the resulting electricity can be used externally to the pump system 20, using an electrical transmission system (e.g., with wires 34, as shown in FIG. 1). For example, electrical power resulting from operation of the engine 24 can be transferred to a battery 25 (or other electrical system) of an associated vehicle 21 in order to charge the battery 25 (or otherwise power the other electrical system). In some embodiments, electrical power from a vehicle battery (or other vehicle system) can be used by the pump system 20 for operation of components thereof (e.g., for operation of an electrical clutch or for direct electronic control of the pumps 22).

In some embodiments electrical controls for electrical power transfer (or other operations) can be implemented. For example, an automatic disconnect circuit 23 (see FIG. 1) can be configured to terminate an electrical connection, or otherwise stop transfer of electrical power, between an external system (e.g., a vehicle battery) and the pump system 20 (or certain components thereof) upon the vehicle engine being started or the occurrence of another condition.

Figure 5:
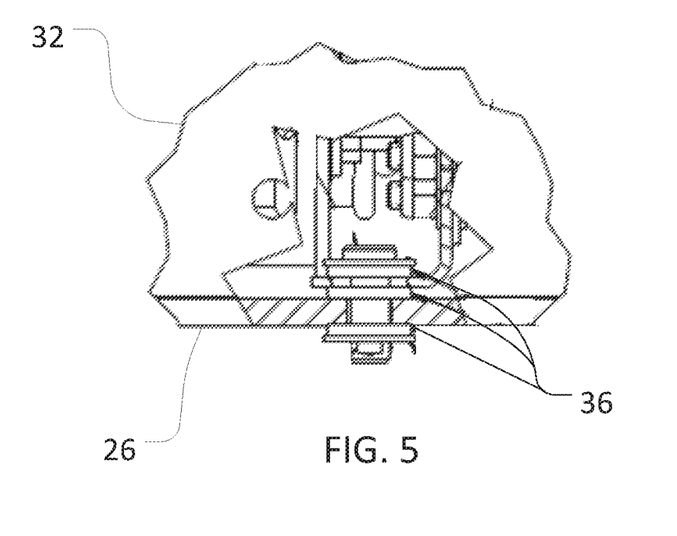
FIG. 5 is an enlarged right side elevation view of area 5-5 of FIG. 3, with certain components partially removed or illustrated in cross-section.

In some embodiments, certain components can be secured with vibration dampening (or other specialized) fastener assemblies. As illustrated in FIG. 5, for example, some attachments between system components can include rubber washers 36, or other dampening components. This arrangement, for example, can help to firmly secure components of the pump system 20 while also potentially reducing any detrimental effects of vibrations, impacts, or other undesired movements or events.

Figure 6:
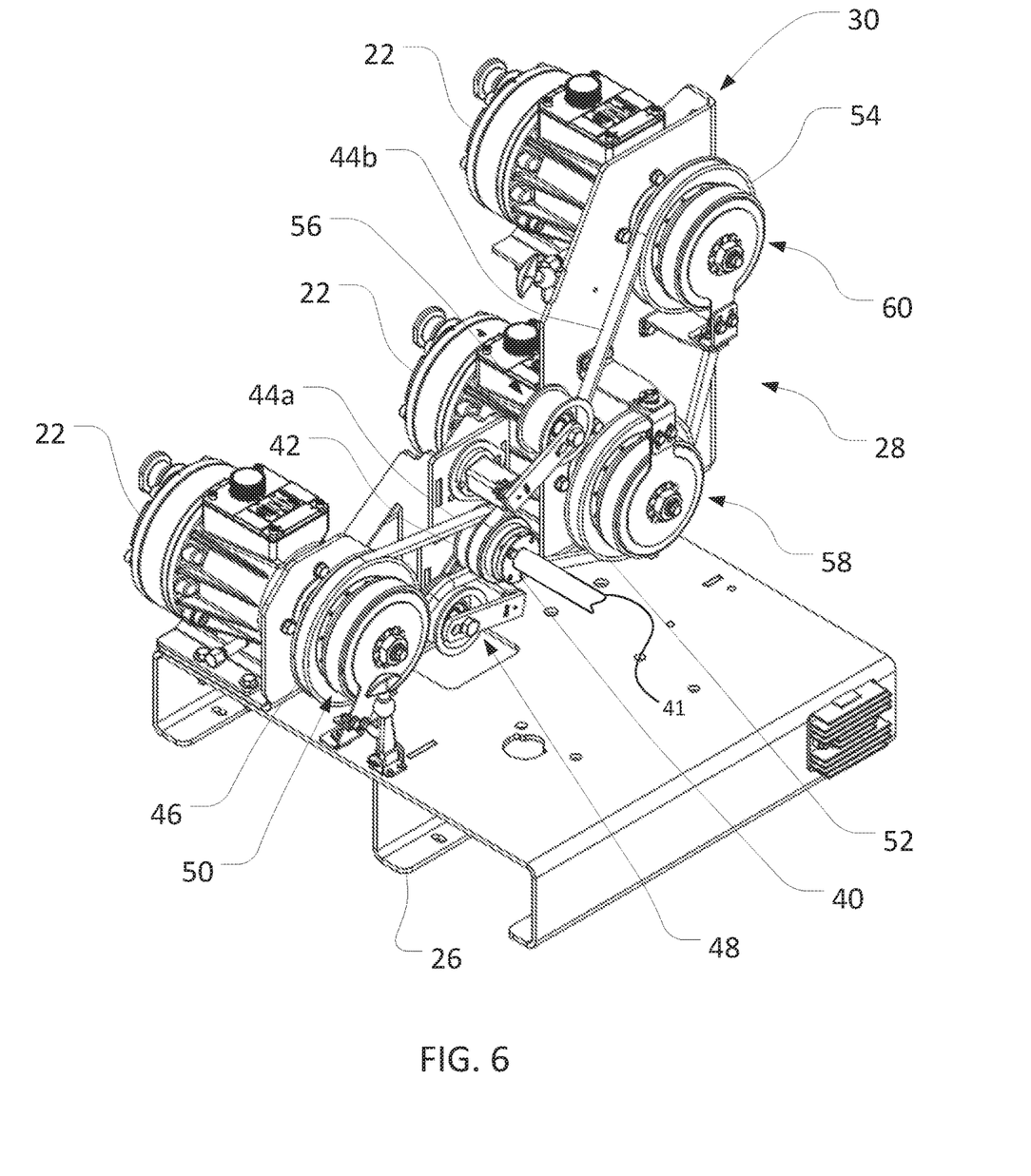
FIG. 6 is a rear, right, top isometric view of select parts of the pump system of FIG. 1.
Figure 7:
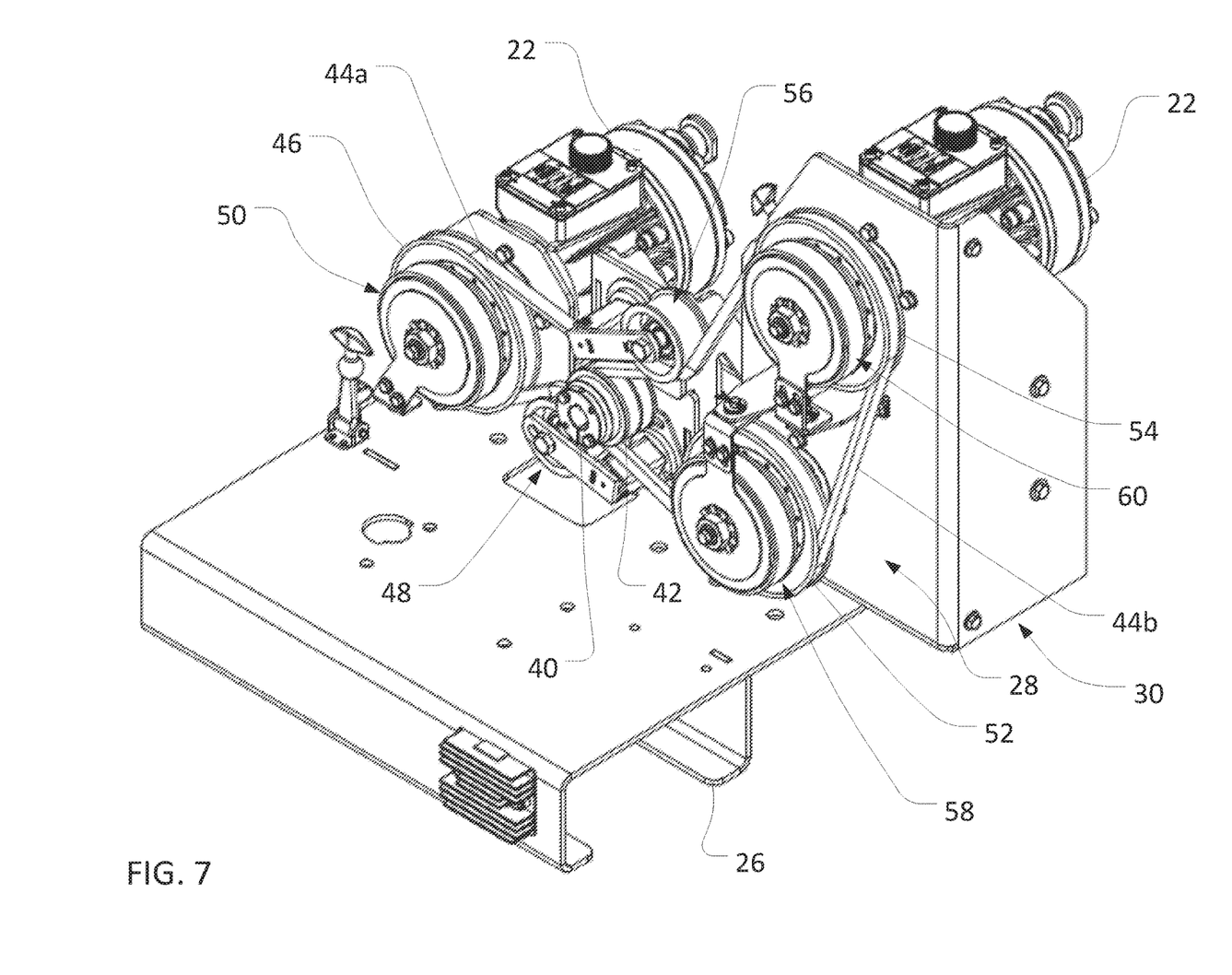
FIG. 7 is a rear, left, top isometric view of select parts of the pump system of FIG. 1.
Figure 8:
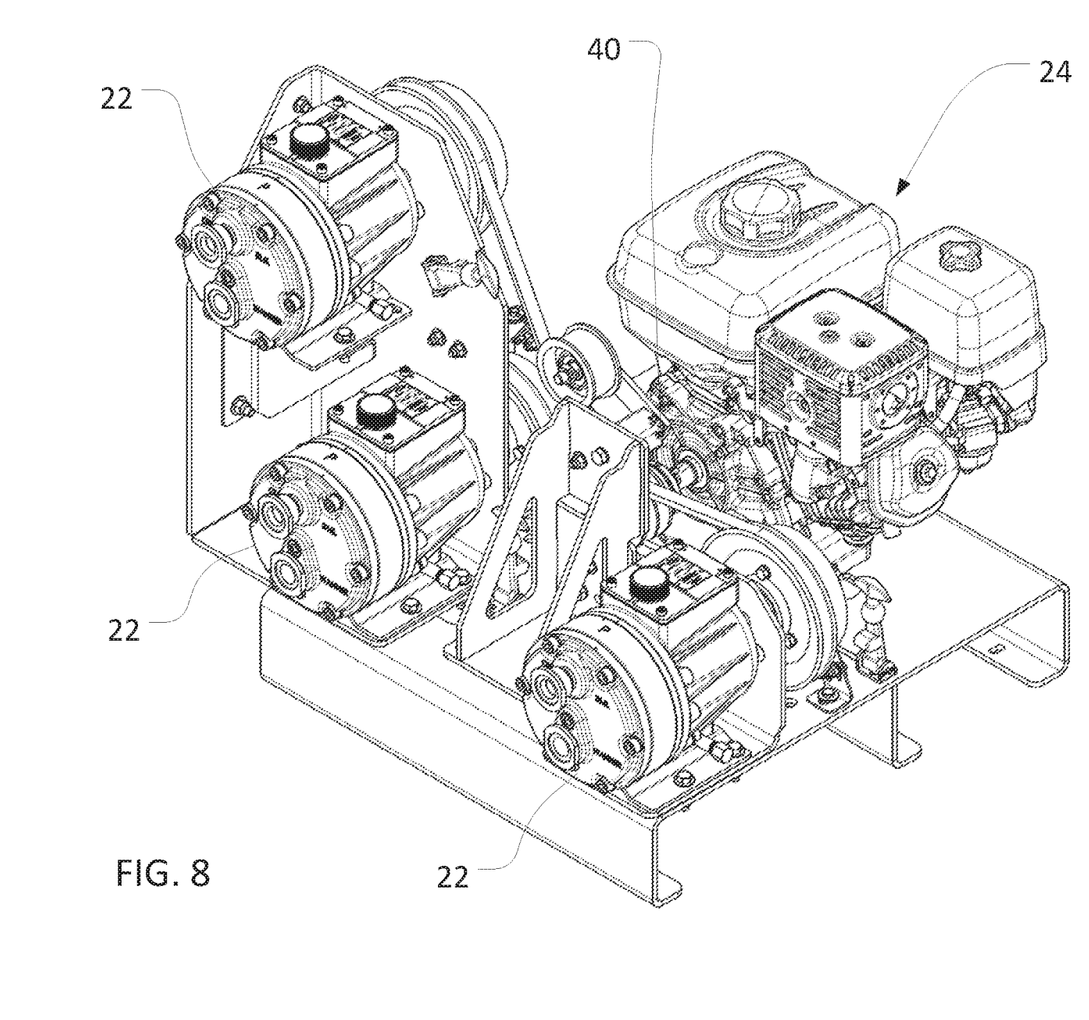
FIG. 8 is a front, right, top isometric view of select parts of the pump system of FIG. 1.

FIGS. 6 through 8 illustrate an example configuration of the transmission system 28 of the pump system 20, in which a belt-drive system supported by the frame 30 and shielded by the shield 32 (see, e.g., FIGS. 1-3) is adapted to transfer rotational power from the engine 24 (not shown in FIGS. 6 and 7) to each of the pumps 22. In the embodiment illustrated, a bushing 40 is configured to engage an output shaft 41 of the engine 24 in order to receive rotational power from the engine 24. Generally, the bushing 40 is coupled to a pulley system, so that a belt or other flexible power transmission element can in turn transfer rotational power from the bushing 40 to the pumps 22.

In the embodiment illustrated, the bushing 40 is connected to a dual pulley 42 that receives two cog-less v-belts 44a and 44b. The v-belt 44a extends from a first rack of the pulley 42 around a larger pulley 46 that is secured to an input shaft of a first one of the pumps 22, with a belt tensioner 48 adapted to ensure appropriate tension of the v-belt 44a around the associated pulleys 42, 46. The pulley 46 is also engaged by an electrical clutch 50, which can be controlled to allow or prevent operation of the associated pump 22, as desired.

Also in the embodiment illustrated, the v-belt 44b extends from a second track of the pulley 42, around larger pulleys 52, 54 that are secured, respectively, to input shafts of a second and third of the pumps 22. As with the v-belt 44a, a belt tensioner 48 is adapted to ensure appropriate tension of the v-belt 44b around the associated pulleys 42, 52, 54. The pulleys 52, 54 are also engaged, respectively, by electrical clutches 58, 60, which can generally be controlled to allow or prevent operation of the associated pumps 22, as desired.

As also noted above, electrical power for operation and control of components of the pump system 20 can be provided from internal or external sources. In some embodiments, for example, electrical power to control the clutches 50, 58, 60 can be provided by a vehicle battery (not shown), which in turn can be recharged using power generated by the engine 24 (see, e.g., FIGS. 1-3).

In other embodiments, other configurations are possible. For example, with respect to power transmission between the engine 24 and the pumps 22, some embodiments can utilize more or fewer flexible power transmission elements than are illustrated in FIGS. 6 and 7. For example, in some embodiments, a single belt (or other transmission element) can be used to transfer power to all of the pumps 22, or a set of dedicated belts (or other transmission elements) can be used to transfer power to each of the pumps 22 individually. Likewise, in some embodiments, different clutch arrangements can be utilized, including arrangements with non-electrical clutches, with clutches disposed at different locations, or with individual clutches that can control power transmission to multiple pumps.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A vehicle-mounted pump system for use with a service vehicle that includes a battery, the vehicle-mounted pump system comprising:
   a chassis configured to be secured to the service vehicle;
   a frame supported by the chassis;
   a plurality of pumps supported by the frame, each of the pumps configured to pump liquid for dispersal external to the service vehicle;
   a power source supported by at least one of the chassis and the frame, the power source being an internal combustion engine;
   a power transmission system configured to transfer power from the power source to the plurality of pumps;
   an electrical transmission system configured to transfer electricity between the vehicle-mounted pump system and an external system, including to charge the battery of the service vehicle; and
   a power disconnect configured to automatically disconnect an electrical connection with the battery, to stop the transfer of electricity from the vehicle-mounted pump system to the battery when an engine of the service vehicle is running.

2. The vehicle-mounted pump system of claim 1, wherein the plurality of pumps are supported by the frame with at least one of the pumps disposed at least partly above another of the pumps.

3. The vehicle-mounted pump system of claim 1, wherein the power transmission system includes a single flexible power transmission element configured to transfer power from the power source to each of the pumps.

4. The vehicle-mounted pump system of claim 3, wherein the single flexible power transmission element is a belt.

5. The vehicle-mounted pump system of claim 3, wherein the power transmission system includes one or more clutches configured to control transmission of power by the single flexible power transmission element.

6. The vehicle-mounted pump system of claim 5, wherein at least one of the one or more clutches is an electrical clutch.

7. A service vehicle comprising:
a battery;
a first internal combustion engine; and
a pulley-driven pump system that includes:
   a chassis configured to be secured to the service vehicle;
   a frame supported by the chassis;
   a plurality of pumps supported by the frame, each of the pumps configured to pump liquid for dispersal external to the service vehicle;
   a second internal combustion engine different from the first internal combustion engine;
   a power transmission system configured to transfer power from the second internal combustion engine to the plurality of pumps;
   an electrical transmission system configured to transfer to the battery electricity generated from power from the second internal combustion engine; and
   a power disconnect configured to automatically disconnect an electrical connection with the battery when the first internal combustion engine is running.

8. The service vehicle of claim 7, wherein the power transmission system includes:
   a belt-drive system configured to transfer rotational power from the power source to each of the plurality of pumps, wherein the belt-drive system includes:
      a plurality of pulleys including at least one dual pulley; and
      at least one flexible power transmission element,
      wherein at least one of the plurality of pulleys is larger than the other pulleys.

9. The service vehicle of claim 8, wherein at least one pulley is engaged by an electrical clutch configured to control transmission of power by the at least one flexible power transmission element.

10. The service vehicle of claim 7, wherein the plurality of pumps includes at least three pumps; and
   wherein the at least three pumps are supported by the frame.

11. The service vehicle of claim 10, wherein at least two of the at least three pumps are mounted on the frame on the same horizontal plane and at least one pump of the at least three pumps is mounted on the frame substantially above the at least two pumps that are mounted on the same horizontal plane.

12. A vehicle-mounted pump system for use with a service vehicle that includes a battery and a first internal combustion engine, the vehicle-mounted pump system comprising:
   a unified support structure that includes a chassis configured to be secured to the service vehicle and a frame supported by the chassis;
   a plurality of pumps supported by the frame, each of the pumps configured to pump liquid for dispersal external to the service vehicle;
   a second internal combustion engine supported by at least one of the chassis and the frame;
   a power transmission system configured to transfer power from the second internal combustion engine to the plurality of pumps;
   an electrical transmission system configured to transfer to the battery, over an electrical connection, electricity generated by the second internal combustion engine; and
   a power disconnect configured to automatically disconnect the electrical connection with the battery when the first internal combustion engine is running;
   wherein the power transmission system is a belt-drive system configured to transfer rotational power from the second internal combustion engine to each of the plurality of pumps, the belt-drive system comprising:
      a plurality of pulleys;
      at least one flexible power transmission element; and
      an electrical clutch configured to control transmission of power to at least one of the pulleys by the at least one flexible power transmission element.

13. The vehicle-mounted pump system of claim 12, wherein the unified support structure further includes a multi-part shield with removable panels.

* * * * *